Aug. 29, 1961 E. E. RANKIN, JR 2,998,521
RADIOACTIVITY WELL LOGGING SYSTEM
Filed June 13, 1957 2 Sheets-Sheet 2

INVENTOR.
EDWARD E. RANKIN JR.,
BY James M. Peppers
AGENT.

United States Patent Office 2,998,521
Patented Aug. 29, 1961

2,998,521
RADIOACTIVITY WELL LOGGING SYSTEM
Edward E. Rankin, Jr., Houston, Tex., assignor, by mesne assignments, to Halliburton Company, a corporation of Delaware
Filed June 13, 1957, Ser. No. 665,443
14 Claims. (Cl. 250—83.6)

This invention generally relates to radioactive logging of well formations and more particularly relates to logging systems wherein two radiation detectors may be used in conjunction with other surveying detectors without loss or aberration of indication from any detector.

Naturally emitted and neutron induced gamma ray logs of well bores are commonly known and presently provided. It is well known that such logs permit identification of formations and further provide information as to the porosities of formations containing hydrogenous materials such as water or oil. In making logs of this type a neutron source is passed through the well bore in fixed and shielded relation with a gamma ray detection means for measuring the intensities of gamma rays induced in adjacent formation by neutron bombardment from the source. A second gamma ray detection means, more remotely located from the neutron source, is concurrently provided with the first detection means to simultaneously detect gamma rays naturally emitted from the surrounding formation. The neutron induced and the naturally emitted gamma intensities are then simultaneously recorded on a common log for subsequent evaluation. At times a continuous log of well bore casing collars may be concurrently provided. At other times a caliper log of uncased well bore may be concurrently provided. Occasionally both the collar counter and caliper logs may be required in combination.

In the logging systems currently provided, the respective pulses from the gamma ray detector and the neutron induced gamma ray detector may be amplified and transferred to the earth's surface in opposite respective polarities on a single conductor cable. These pulses may be transmitted over such cable either directly or superimposed on an A.C. carrier voltage of constant frequency. When provided, the collar counting circuits transmit like signals over the common conductor. Or, in the case of a caliper in combination, the caliper signal is usually transmitted to the surface as a D.C. voltage. The pulses from each radiation detector, rather than being transmitted at opposite polarities, presently may also be transmitted of the same polarity, the pulses from one detector having a larger amplitude than the pulses from the other.

The existing systems, when provided in the combinations described, exhibit high noise levels which tend to obviate transmitted signals. Also such systems produce ringing transients which may be falsely counted at the surface as spurious pulses. In view of the present requirements toward combination tools, a system is necessary which will provide transmission of the radioactive intelligence in combination with other signals without introducing such spurious indication.

In present equipment, coincidental pulses from the two radiation detectors result in possible loss of both pulses when transmitted at opposite polarity, or, loss of one pulse when transmitted at varied amplitudes. There is therefore a need for a system which will transmit and detect these pulses without such loss.

It is therefore the general object of the present invention to provide a system for simultaneous detection and transmission of neutron induced gamma ray emission and naturally gamma ray emission in combination with other detection means, without lost or spurious counts being reflected in the finished well log.

An additional object of the present invention is to provide a system for transmission of such intelligence without loss of fidelity.

Briefly described, the present invention is a first radiation detection means adapted to produce pulses in response to quanta of natural occurring radiation in a well formation, a first scaling means adapted to generate a single pulse in response to a preselected number of pulses received from said first detection means, a pulse shaping means adapted to generate a pulse of preselected polarity, amplitude, and duration in response to each pulse received from said first scaling means, second radiation detection means adapted to produce a pulse in response to quanta of radiation induced in said surrounding formation by bombardment from a neutron source, a second scaling means adapted to generate a pulse in response to a preselected number of pulses from said second detection means, said second scaling means being adapted to receive a greater number of pulses than said first scaling means to produce said output pulse, a second pulse shaping means adapted to produce a pulse in response to a pulse received from said second scaling means of different duration, amplitude, and polarity to said first pulse shaping means, a mixing and modulating means adapted to modulate a frequency modulated transmission means from a preselected carrier frequency to transmit a signal modulated in response and direct proportion to pulses received from said first and second pulse shaping means, said carrier frequency and said pulse duration being of such relation as to permit a frequency discrimination means to demodulate said frequency modulated signal to produce like pulses to a receiving and recording means.

Further objects of the invention will appear from the following description and claims taken in connection with the attached drawings, wherein:

FIGURE 3 is an illustration of pulses generated in response to each detector and transmitted to the earth's surface for recording;

FIGURE 4 is a graphic illustration of the frequency shift of an FM carrier frequency in response to such pulses.

Figure 1:
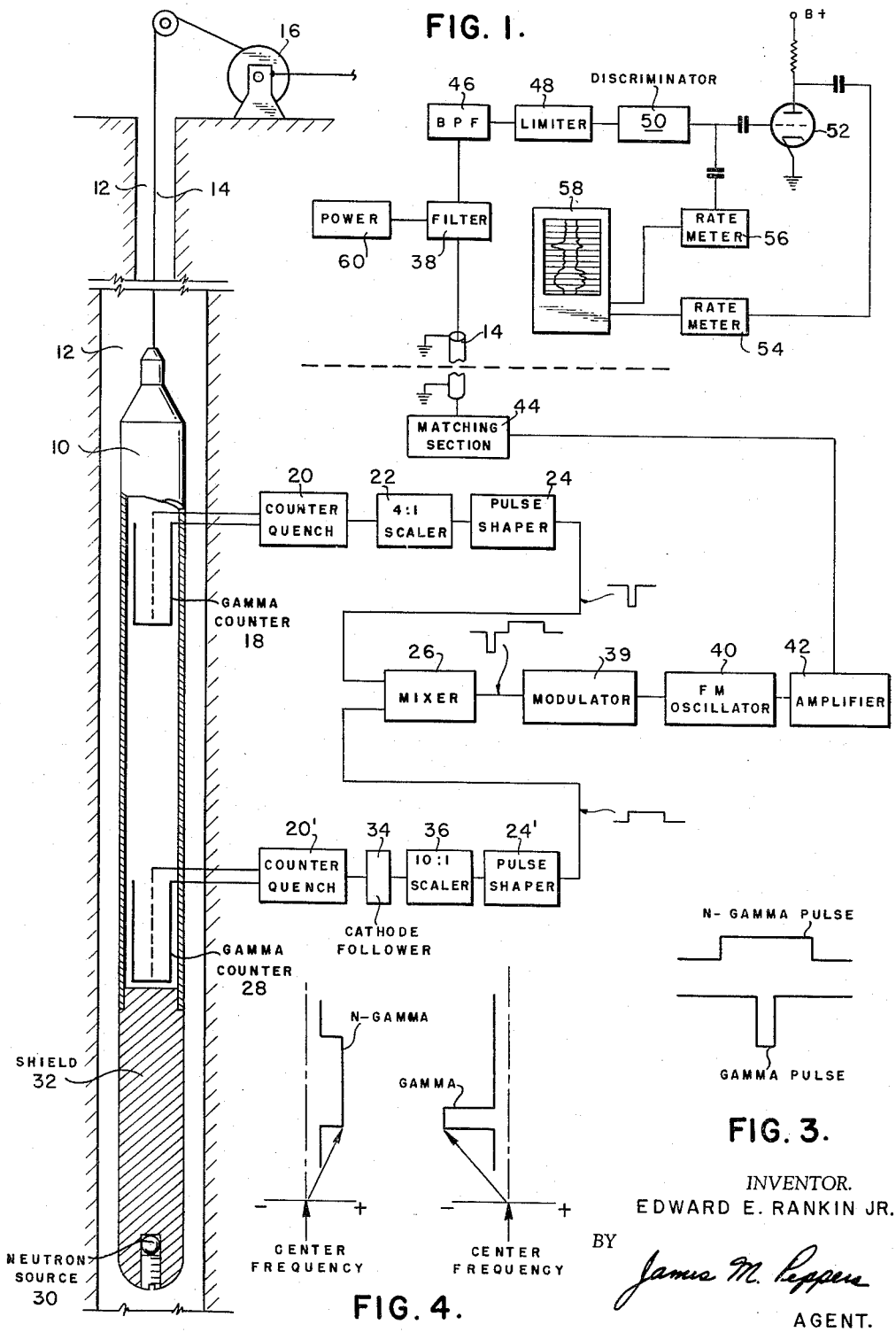
FIGURE 1 is a diagrammatic illustration of a radioactivity logging system located in a well bore.

Now referring to FIGURE 1, there is illustrated a logging tool 10 suspended in a well bore 12 from a single conductor logging cable 14. Tool 10 is adapted to be raised or lowered in a well bore at a convenient rate by means of a hoisting apparatus 16. Electrical connection is made through hoisting means 16 (not shown) from the conductor of cable 14 to the surface receiving and recording apparatus shown at the right.

That portion of the system at the right of FIGURE 1 that is shown below the dashed line is provided within the tool 10. That portion shown above the dashed line is provided at the surface. A gamma ray detector of the Geiger-Müller type, hereinafter referred to as gamma counter 18, is provided in the upper portion of tool 10. When provided as shown gamma counter 18 will respond to the natural radioactivity of the adjacent formation traversed by well bore 12.

Gamma counter 18 is connected into a quench circuit 20. The purpose of quench 20 is to quench the current flow initiated through counter 18 in response to the individually intercepted gamma rays from the surrounding formation. The output of quench 20 is connected into a scaler circuit 22, provided to generate a single output pulse into a pulse shaper circuit 24 upon reception of a predetermined number of pulses from quench 20. Scaler 22 is herein provided with a factor of 4:1 as an example. Pulse shaper 24 produces a pulse of predetermined amplitude, duration, and polarity in response to each pulse received from scaler 22. Shaper 24 is connected into a mixer circuit 26.

Located in the lower portion of tool 10 is a second gamma ray detector, herein referred to as a neutron induced or n-gamma counter 28, located in predetermined proximity to a neutron source 30. Provided between n-gamma counter 28 and source 30 is a gamma ray shield 32.

It is pointed out that counters 18 and 28, though provided herein as Geiger-Müller type detectors, could be scintillation or any other pulse producing type radioactivity detector and operate with equal facility in the system provided by this invention.

As provided, the spacing between n-gamma counter 28 and neutron source 30 is such that neutrons from said source must travel a considerable distance in the borehole and surrounding formation before inducing gamma radiation adjacent n-gamma counter 28.

Thus, in formations having high neutron absorption qualities, such as water or oil bearing sands or shales, the neutrons bombarding the formation will be absorbed close to source 30 and the induced gamma radiation will have little effect on n-gamma counter 28. However, in formations having low neutron absorption qualities, the neutrons may travel to close proximity with n-gamma counter 28 before inducing gamma radiation. N-gamma counter 28 will thereon indicate an appreciably higher count.

As is gamma counter 18, n-gamma counter 28 is connected to a quench circuit 20′ which, as later described, is identical to quench circuit 20. The output of quench circuit 20′ feeds through a cathode follower 34 into a scaler circuit 36. Scaler 36 is provided to generate one pulse in response to a predetermined number of pulses received from quench 20′. Scaler 36 is connected into a pulse shaper 24′ which, in response to each received pulse, will produce a pulse of predetermined amplitude, duration and polarity. The output of shaper 24′ is connected into mixer and modulator 26.

Mixer 26 is connected into a modulator circuit 39, then into oscillator 40, herein exampled as having a center carrier frequency of 22.5 kc. FM oscillator 40 is modulated by modulator 39 in response to the respective pulses received from shapers 24 and 24′. The modulated output of FM oscillator 40 is amplified by an amplifier 42 and transmitted through a matching section 44 and the conductor of cable 14 to the surface of the earth.

The modulated signal is taken from cable 14 at the surface through a band pass filter 46 and introduced through a limiter 48 into a discriminator 50. Discriminator 50 demodulates the signal into the individual pulses previously received at mixer 26 from shapers 24 and 24′. The demodulated signal is impressed onto the grid of a triode 52. The reversed signal, taken from the plate of triode 52, is impressed into a gamma rate meter 54. The signal from discriminator 50 is directly impressed into an n-gamma rate meter 56. As provided, rate meters 54 and 56 integrate positive pulses received thereto into a responsive direct voltage but reject received negative pulses. Voltage from rate meter 54 is impressed into a recorder 58 and recorded as a log responsive to the pulses initially produced by gamma counter 18. Voltage from rate meter 56, also impressed into recorder 58, is recorded as a log responsive to the pulses initially produced by n-gamma counter 28.

Power from a source 60, impressed into the conductor of cable 14 through a filter 38, provides power, later separated for use in tool 10 by matching section 44, for heater filaments, B+ source, and high voltage supply (not shown).

Figure 2:
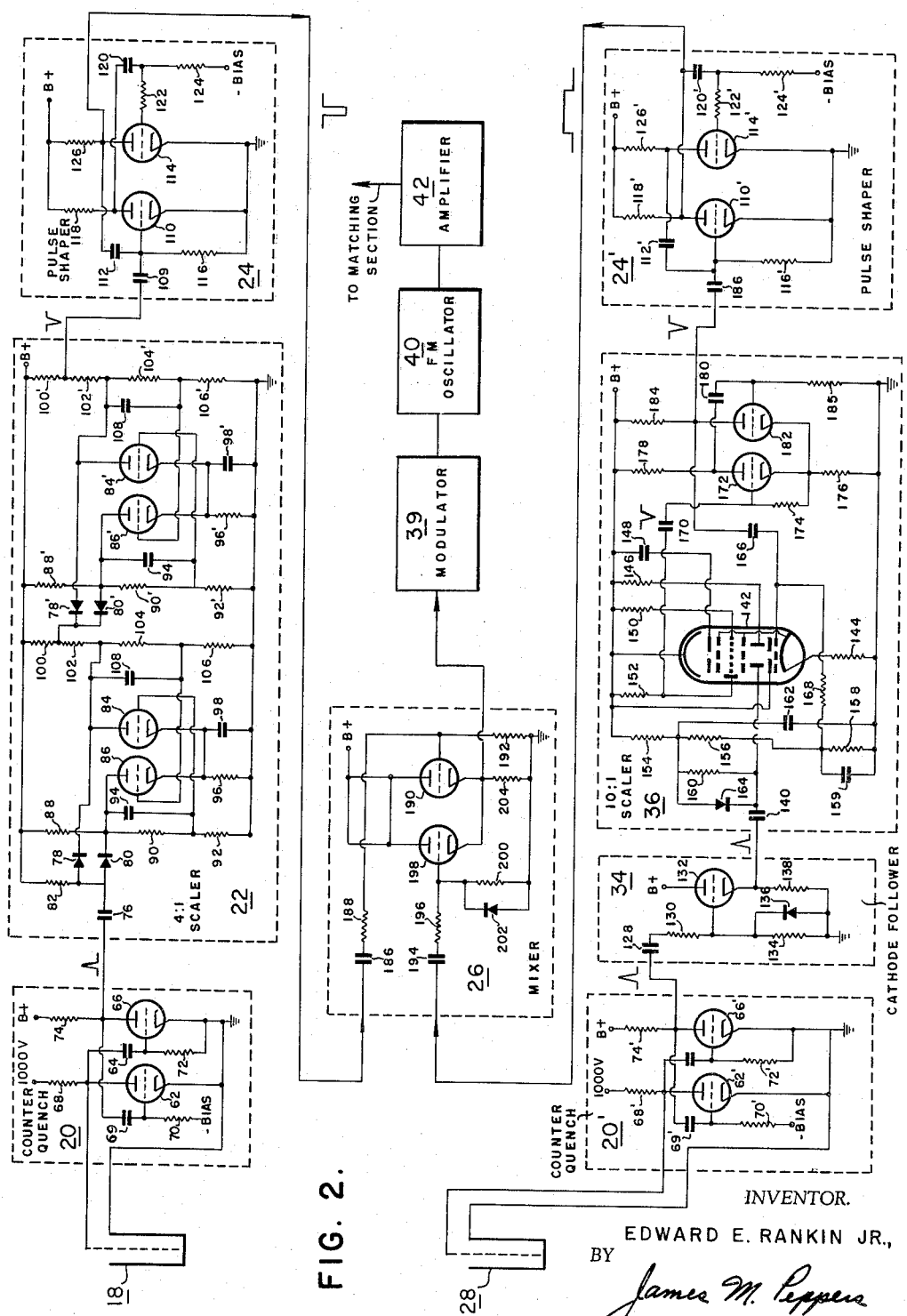
FIGURE 2 is a schematic illustration showing the circuits of the system in detail.

Referring to FIGURE 2, there is illustrated in dashed lines the component circuits of tool 10 provided in FIGURE 1. The cathode of gamma counter 18 is connected to ground and the anode is connected to the plate of a triode 62 and through a capacitor 64 to the grid of a triode 66. Gamma counter 18 anode is also connected through a resistor 68 to a source of high voltage, herein exampled as 1000 volts. The grid of triode 62 is connected through a resistor 70 to a source of −bias voltage and through a capacitor 69 to the plate of triode 66. The grid of triode 66 is connected through a resistor 72 to ground. The plate of triode 66 is connected through a resistor 74 to a B+ source.

Interception of a gamma ray photon causes counter 18 to initially conduct, lowering the voltage at the plate of triode 62 and at the grid of triode 66. Triode 66 is normally conducting. Triode 62, in response to the −bias through resistor 70, is normally cut off. The negative voltage then appearing at the grid of triode 66 causes cut-off. A positive pulse from the plate of triode 66 then passes through capacitor 69 to the grid of triode 62. Triode 62 thereon begins and continues to conduct until the capacitors 64 and 69 discharge. The plate of triode 62 thereon returns, upon cut-off of triode 62, to the original high voltage. However, due to the capacitance of counter 18, this rise will be exponential, taking some 200 microseconds for complete recovery.

The grid voltage of triode 66 rises, permitting conduction. The resulting voltage drop at the plate of 66 thereon cuts off triode 62 which remains cut off due to the −bias. The cycle may now be repeated when next initiated by counter 18. The resulting positive pulse, when found at the plate of triode 66 as herein provided, has a duration of about 30 microseconds and a peak voltage of 150 volts.

The output of quench 20, taken from the plate of triode 66, is connected into scaler 22 through a capacitor 76 to diodes 78 and 80 and through a resistor 82 to B+. Diode 78 is connected to the plate of a triode 84 and to the junction of voltage dividing resistors 102 and 104. Resistors 102 and 104 form a portion of a voltage divider provided by series connection of resistors 100, 102, 104, and 106 from B+ to ground.

Diode 80 is connected to the plate of a triode 86 and to the junction of voltage dividing resistors 88 and 90 which form a part of a voltage divider provided by series connection of resistors 88, 90, and 92 from B+ to ground. A capacitor 94 is connected across resistor 90.

The grid of triode 84 is connected to the junction of resistors 90 and 92. The grid of triode 86 is connected to the junction of resistors 104 and 106. The cathodes of triode 84 and 86 are connected through a resistor 46 to ground and through a capacitor 98 to ground. A capacitor 108 is connected across resistor 104. Connection is made from the junction of resistors 100 and 102 to the next stage of counter 22.

This portion of scaler circuit 22 presently described forms a binary counter exhibiting a differential voltage shift at the junction of resistors 100 and 102 upon each pulse application through capacitor 76. In operation, either triode 86 or 84 may initially be conducting. Assuming triode 86 to be conducting, such conduction lowers the grid voltage on triode 84 and raises the cathode voltage, holding triode 84 in cut-off condition. With triode 84 cut off, the grid of triode 86 is at large positive potential, allowing continued conduction of triode 86.

Upon reception of a positive pulse through capacitor 76 and diodes 78 and 80, such pulse passes through capacitors 94 and 108 to the grids of triodes 84 and 86. Such positive pulse has no effect upon conducting triode 86 but causes triode 84 to begin conducting. Conduction through triode 84 lowers it plate voltage, causing a lowered grid voltage at triode 86. Triode 86 then cuts off. A second positive pulse from quench circuit 20 will now reverse this procedure, causing triode 86 to conduct and triode 84 to cut off.

It is then seen that each two pulses from quench 20 causes the plate of triode 84 to shift from a first voltage to a second voltage and then return to said first voltage.

Upon such occurrence a proportionate voltage shift will also be found at the junction of voltage dividing resistors 100 and 102. The output of this stage, taken at said junction, is connected into the next stage.

This stage of scaler 22, being identical to the first stage, has been assigned the same but primed numbers. The output of the first stage, taken at the junction of resistors 100 and 102, passes through diodes 78′ and 80′. Since pulses of single polarity can pass diodes 78′ and 80′, only one pulse is passed into this stage for each complete voltage shift at said junction. The second stage therefore receives one initiating pulse for each two initiating pulses received in the first stage.

The second stage of scaler 22, as illustrated with primed numbers, operates in a manner identical to the previously described first stage. A voltage shift at the junction of resistors 100′ and 102′, of a selected polarity, will then occur upon each four pulses entering scaler 22 from quench 20. Then, if a subsequent circuit, connected to the junction of resistors 100′ and 102′, is provided sensitive only to pulses of one polarity, for example negative pulses, such circuit will be activated once for each four pulses entering scaler 22.

The output of scaler 22, taken from said junction, is connected to pulse shaper 24 through a capacitor 108 to the grid of a triode 110. Triode 110 grid is connected through a capacitor 112 to the plate of a triode 114 and through a resistor 116 to ground. The cathode of both triodes 110 and 114 are connected to ground. The plate of triode 110 is connected through a resistor 118 to B+. The grid of triode 114 is connected through a resistor 122 and a resistor 124 to a —bias. The plate of triode 114 is connected through a resistor 126 to B+.

As provided, triode 110 is initially conducting and triode 114 is cut off in response to the —bias. A negative voltage shift then received from junction of resistors 100′ and 102′ of scaler 22, upon passing through capacitor 109 to the grid of triode 110, will reduce conduction through said triode 110. The voltage at the plate of triode 110 then begins to rise, passing an increased voltage through a capacitor 120 and resistor 122 to the grid of triode 114. The triode 114 thereon begins to conduct, causing a lessened voltage at the plate thereof. Such reduced voltage from the plate of triode 114 passes through capacitor 112 to the grid of triode 110, further reducing conduction through said triode to cut-off. Triode 114 is then conducting. Triode 114 continues to conduct until the charge on capacitor 112 leaks off through resistor 116 and the charge on capacitor 120 leaks off through resistor 124. Conduction through triode 114 thereupon ceases due to the —bias. The plate voltage of triode 114 thereon rises, such increased voltage passing through capacitor 112 to the grid of triode 110. Triode 110 thereon starts to conduct, causing the plate voltage of triode 110 to drop. Such voltage drop passes through capacitor 120 and resistor 122 to the grid of triode 114, causing said triode to cut off. The —bias at the grid of triode 114 maintains cut-off condition until another negative pulse is received into shaper 24 from scaler 22. The amplitude of the negative plate voltage initiated at the plate of triode 114 is limited by resistor 122, providing a very square negative pulse at the plate of triode 114. The duration of the negative pulse depends primarily on the time constant of capacitor 112 and resistor 116 in combination with capacitor 120 and resistor 124. The output of shaper 124, taken from the plate of triode 114, is connected into mixer 26, as later described. As illustrated, the output pulse from shaper 24 is of short duration and negative polarity, for example 400 microseconds at —50 volts.

The anode of n-gamma counter 28 is connected into quench 20′ at the plate of a triode 62′. Examination of quench 20′ will reveal identical construction and mode of operation to that of quench 20. Corresponding primed numbers have therefore been assigned. The output of quench 20′ is also taken at the plate of triode 66′. However, since the scaler 36 is of low impedance, a cathode follower 34 has been connected between quench 20′ and said scaler.

The positive pulses, taken from the plate of triode 66′, passes into the cathode follower 34 through a capacitor 128 and a resistor 130 to the grid of a triode 132. The grid of triode 132 is connected through a resistor 134 to ground and a diode 136 to ground. Diode 136 prevents negative overshoot of received positive pulses. The cathode of triode 132 is connected through a resistor 138 to ground and the plate of said triode is connected to B+. Since triode 132 is normally conducting, a change of voltage on its grid will cause a corresponding voltage change across resistor 138.

Connection is made from the cathode of triode 132 into scaler 36 through a capicitor 140 to the left deflection electrode of a counter tube 142. Since the factor of scaler 36 is herein exampled and may conveniently be 10:1, the tube 142 is herein provided as a decade counter. Tube 142, as provided, is specially designed for the counting and indicating of electrical pulses. Tube 142 is a cathode ray tube which, according to the number of counting pulses applied, provides a ribbon shaped electron beam which is shifted in succession through the apertures of a cylindrical anode. Upon shifting of the beam through a predetermined number of positions, the beam is reset to its zero position and a counting pulse is simultaneously applied to a successive circuit, herein illustrated as pulse shaper 24′. The tube herein provided is a "Amperex" type E1T decade counter tube, provided by the Amperex Electronic Corporation, 230 Duffy Ave., Hicksville, L.I., New York. Though connection and operation of this counter is herein only briefly described, detailed explanation and typical component values may be found in Amperex Manual 20/D/4602 AE5/54.

Tube 142 cathode is connected through a resistor 144 to ground and the plate is connected to B+. The anode and right deflection electrode is conected through a resistor 146 to B+. A capacitor 148 is connected across resistor 146. The slotted electrode is connected through a resistor 150 to B+. The reset anode is connected through a resistor 152 to B+ and into a one shot reset multivibrator, provided by triodes 172 and 182, as later described. The accelerating electrode is connected directly to B+. The left deflection electrode is also connected through a resistor 160 into a voltage divided at the junction of resistors 154 and 156. Said voltage divider is provided by series connection of resistors 154, 156 and 168 from B+ to ground. A capacitor 162 is connected across resistor 156 and 158 to ground. A diode 164 is provided across resistor 160 to prevent negative overshoot of positive pulses received through the capacitor 140 from cathode follower 34. The control grid of tube 142 is connected through a capacitor 166 to the plate of triode 182 and through a resistor 168 to the junction of resistors of 166 and 158. A capacitor 159 is connected across resistor 158. The reset anode of tube 142 is connected through a capacitor 170 to the grid of triode 172.

The grid of triode 172 is connected through resistors 174 and 176 to ground, the plate is connected through a resistor 178 to B+, and the cathode is connected through resistor 176 to ground. The plate of triode 182 is connected through a resistor 184 to B+ and through capacitor 166 to the control grid of tube 142. The grid of triode 182 is connected through a capacitor 180 to the plate of triode 172 and through a resistor 185 to ground.

Application of a positive pulse from cathode follower 34 to the left deflection electrode of tube 152 displaces the electron beam to a successive aperture of the anode. The voltage of the right deflection electrode thereon rises exponentially, in response to the action of resistor 146 and capacitor 148, causing the beam to remain in position, Each successive pulse causes the same action. Upon arrival of the tenth pulse, the electron beam is deflected to the reset anode, causing conduction. The voltage thereon drops at the reset anode causing like drop through capacitor 170 to the grid of triode 172 of the reset multivibrator. The multivibrator thereon produces a negative pulse through capacitor 166 to the control grid of tube 142, returning the electron beam to the zero position. Thus, 10 input pulses from cathode follower 34 into tube 142 produces one negative pulse from the reset anode of tube 142 to the reset multivibrator which in turn produces a negative pulse which may be used at an output pulse to pulse shaper 24'.

Initially in operation, triode 172 is conducting and triode 182 is cut off. The cathodes of both triodes 172 and 182 are at high voltage. A negative pulse from the reset anode of tube 142 causes triode 172 to cut off, lowering the cathode voltage of triode 182. Triode 182 thereon begins to conduct. The plate voltage of triode 172 concurrently rises, increasing the grid voltage of triode 182 through capacitor 180. Triode 172 is thereon cut off while triode 182 is conducting. During this period the voltage drops at the plate of triode 82. Such drop passes through capacitor 166 to reset tube 142 and passes to pulse shaper 24' through capacitor 186. When capacitor 180 has discharged through resistor 185, tube 172 again conducts and triode 182 is cut off.

It will be noted that pulse shaper 24' is of like construction to pulse shaper 24 and will operate as previously described. Corresponding primed numbers have therefore been assigned thereto. However, to provide a reverse polarity of pulse output, the output connection from shaper 24' to mixer 26 is made at the plate of triode 110' rather than at the plate of triode 114'. Also, as with shaper 24, the duration and amplitude of the generated pulse is provided by resistor 122', capacitor 120', and resistor 124', as previously described. As illustrated, the output pulse from shaper 24 is of opposite polarity, longer duration, and less amplitude than the pulse from shaper 24.

Pulse shapers 24 and 24' are connected into mixer 26, the output of shaper 24 being representative of gamma counter 18 and the output of shaper 24' being representative of n-gamma counter 28. Shaper 24 is connected through a capacitor 186 and a resistor 188 to the grid of a triode 190 which is connected through a resistor 192 to ground. The output of shaper 24' is connected through a capacitor 194 and a resistor 196 to the grid of a triode 198, which is also connected to ground through a resistor 200. A diode 202 is connected across resistor 200 to prevent negative overshoot of positive pulses received from shaper 24'. The plates of triode 190 and 198 are connected to B+ and the cathodes of said triodes are commonly connected through a resistor 204 to ground. The output of mixer and modulator 26, taken from the cathodes of triodes 198 and 190, is connected into modulator 39.

As provided, both triodes 190 and 198 conduct. Voltage changes at the grids of either triode will cause corresponding changes of voltage across resistor 204. Thus, respective pulses received from shaper 24 and 24' cause corresponding pulses to be generated by mixer 26. The signal generated by mixer 26 passes into modulator 39 which modulates FM oscillator 40 in direct response. As provided, modulator 39 varies the center carrier frequency, within a predetermined band width, in direct response to the voltage polarity and amplitude from mixer 36.

For additional detailed description of FM transmission logging systems reference may be had to Patent No. 2,573,133 to Greer. FIGURE 5 therein illustrates a suitable FM modulator and oscillator.

The output of FM oscillator 40, is then amplified by amplifier 42. The amplified FM signal is then transmitted through matching section 44, the conductor of cable 14, band pass filter 46, and limiter 48 for demodulation at discriminator 50.

In operation, gamma counter 18, in combination with quench 20, exhibits a positive pulse upon each quantum of gamma radiation intercepted. Scaler 22 thereon generates one pulse in response to each four pulses received from gamma counter 18. The pulses from scaler 22 are shaped to predetermined amplitude and duration by shaper 24, herein exampled as negative pulses of 400 microseconds and —50 volts, and impressed into mixer 26.

N-gamma counter 28, in combination with quench 20', exhibits a pulse in response to each quantum of gamma radiation intercepted from the surrounding formation which has been produced by neutron bombardment from source 30. The amount of such radiation will be inversely proportional to the absorption qualities of the formation immediately surrounding source 30, as previously described. Each pulse so produced is impressed through cathode follower 34 into scaler 36. Scaler 36 generates one pulse for each 10 pulses received from n-gamma counter 28. The output pulse of scaler 36 is impressed into pulse shaper 24' which generates a corresponding pulse shaped to predetermined amplitude and duration, herein exampled as a positive pulse of 25 volts and 1000 microseconds' duration, and impresses such pulse into mixer 26.

The output of mixer 26 is a composite voltage containing the outputs of both shapers 24 and 24'. It is seen that, if a pulse arrives from shaper 24 coincident with the arrival of a pulse from shaper 24', the composite pulse generated by mixer 26 will be a negative pulse superimposed upon a positive pulse. However, due to the amplitudes variation and opposite polarity of these pulses, the component pulse will still have positive and negative swings. It is seen that, if the negative pulse from shaper 24 were to arrive with the positive pulse from shaper 24' such that the pulse from shaper 24' were separated into two separate pulses (within the duration period of the original pulse), then three pulses could then result. In such example, the leading positive portion would be followed by a negative portion, of reduced amplitude, in turn followed by a trailing positive portion, all within the exampled 1000 microseconds. When transmitted to the earth's surface, these respective positive and negative portions would be received at rate meters 54 and 56.

Rate meter 56 is therefore provided with a multivibrator of similar nature to shapers 24 and 24', having a respective recovery or "dead" time such that only one pulse may be received in the pulse duration period previously provided by the shaper 24'. Thus, when rate meter 56 is triggered by a positive 25 volt 1000 microsecond pulse from shaper 24' which has been broken by a coincidental negative pulse from shaper 24, said meter, provided with a dead time of at least 1000 microseconds, will be insensitive to the trailing portion of the broken pulse.

When desired a casing collar counter inductance bridge may be provided in the tool 10, for example above gamma counter 18. The unbalance voltage of such a bridge may be employed to actuate a separate modulator and FM oscillator, also provided in tool 10. This second FM signal, provided for example at 10.5 kc., would also be transmitted through matching section 44. At the surface such signal would be separately filtered, limited, demodulated by a circuit similar to that presently provided, and recorded at recorder 58 as a separate log.

In some cases, such as in well bores which are partially cased, it may be desirable to have a caliper log of the uncased portion and a count of the casing collars in the cased portion. In such event a caliper assembly may be provided in the tool 10. A suitable caliper would be one having one or more arms adapted to engage the well bore wall which would actuate series connected variable resistors in response to the varied extension of said arms with varied bore diameter. A varied voltage then found across such resistors, which would be indicative of such diameter, would be used to actuate another modulator and FM oscillator, as previously described. The resulting caliper signal may then be recorded as a separate log at recorder 58.

It is of course obvious that the radioactive detection system, as herein described, may be used in combination with either a collar counter or caliper assembly, or, in combination with both.

FIGURE 3 generally illustrates suitable n-gamma and gamma pulses in graphic manner. As illustrated, it is seen that the n-gamma pulse is of less amplitude and longer duration than the gamma pulse. Thus, if such pulses are concurrently received in mixer 26, modulator 39 would modulate FM oscillator 40 in response to either or a composite of both pulses, as previously described.

Referring to FIGURE 4, there is graphically illustrated changes in center frequency of oscillator 40 in response to modulator 26. The n-gamma pulse, being positive, will change the carrier frequency in plus direction in amount proportional to pulse amplitude. Thus, the n-gamma pulse will be transmitted to the earth's surface at a frequency of $F+\Delta F$. The gamma pulse causes the carrier frequency of oscillator 40 to change in minus direction dependent upon pulse amplitude. The gamma pulse will then be transmitted at frequency of $F-\Delta F$.

By means of the system illustrated, loss of coincident counts of the counters 18 and 28 are eliminated, and spurious counts introduced by high noise levels and/or transients caused by other detected intelligence are also eliminated. The fidelity of the logs produced by this system is equal or greater than the efficiency of counters presently available.

Other modifications and embodiments of the invention, as herein set forth, may be made without departing from the spirit and scope thereof. Therefore only such limitations should be imposed as are indicated in the appended claims.

That being claimed is:

1. Well logging apparatus of the type described, comprising, a first radiation detector of pulse producing character, a first scaling means in connection with said first radiation detector for producing a pulse responsive to a first number of pulses received from said first radiation detector, a first pulse shaping means in connection with said first scaling means for producing a first shaped pulse of desired polarity, amplitude and duration responsive to each pulse received from said first scaling means, a second radiation detector of pulse producing character, said second radiation detector having radioactive particle bombardment means provided in shielded relation thereto, a second scaling means in connection with said second radiation detector for producing a pulse responsive to a second number of pulses received from said second radiation detector, a second pulse shaping means in connection with said second scaling means for producing a second shaped pulse of different polarity, amplitude and duration than said first shaped pulse, a signal transmission means of desired center frequency, means in connection with said first and said second scaling means for modulating the frequency of said transmission means from its center frequency in respective response to the polarity, amplitude and duration of said first and second shaped pulses, frequency discrimination means in connection with said transmission means for producing pulses of like character to said first and second shaped pulses responsive to the frequency modulated signal from said transmission means, and receiving means in connection with said discrimination means for producing continuous indications of magnitude indicative of the repetition rate of pulses respectively produced by said first and said second radiation detectors.

2. The apparatus of claim 1 wherein said first and second detectors are Geiger-Müller counters.

3. The apparatus of claim 1 wherein said first and second detectors are scintillation counters.

4. Well logging apparatus of the type described, comprising, a first radiation detector of pulse producing character, a first pulse shaping means in connection with said first radiation detector for producing a first shaped pulse of desired polarity and shape responsive to each pulse received from said first radiation detector, a second radiation detector of pulse producing character, said second radiation detector having radioactive particle bombardment means provided in shielded relation thereto, a second pulse shaping means in connection with said second radiation detector for producing a second shaped pulse of different polarity and shape than said first shaped pulse, a signal transmission means of desired center frequency, means in connection with said first and said second pulse shaping means for modulating the frequency of said transmission means from its center frequency in respective response to the polarity and shape of said first and second shaped pulses, frequency discrimination means in remote connection with said transmission means for producing pulses of like character to said first and second shaped pulses responsive to the frequency modulated signal from said transmission means, and receiving means in connection with said discrimination means for producing respective continuous indications of magnitude indicative of the repetition rate of said shaped pulses.

5. Well logging apparatus of the type described, comprising, a first radiation detector of Geiger-Müller type, a first scaling means in connection with said first radiation detector for producing a pulse responsive to a first number of pulses received from said first radiation detector, a first pulse shaping means in connection with said first scaling means for producing a first shaped pulse of desired polarity, amplitude and duration responsive to each pulse received from said first scaling means, a second radiation detector of Geiger-Müller type, a seond scaling means in connection with said second radiation detector for producing a pulse responsive to a second number of pulses received from said second radiation detector, a second pulse shaping means in connection with said second scaling means for producing a second shaped pulse of different polarity, amplitude and duration than said first shaped pulse, a signal transmission means of desired center frequency, and means in connection with said first and said second scaling means for modulating the frequency of said transmission means from its center frequency in respective response to the polarity, amplitude and duration of said first and second shaped pulses.

6. The apparatus of claim 5 wherein said first number of pulses can be evenly divided by two.

7. The apparatus of claim 5 wherein said second number of pulses can be evenly divided by ten.

8. The apparatus of claim 7 wherein said first number of pulses can be evenly divided by two.

9. Well logging apparatus of the type described, comprising, a first radiation detector of scintillation type, a first scaling means in connection with said first radiation detector for producing a pulse responsive to a first number of pulses received from said first radiation detector, a first pulse shaping means in connection with said first scaling means for producing a first shaped pulse of desired polarity, amplitude and duration responsive to each pulse received from said first scaling means, a second radiation detector of scintillation type, said second radiation detector having radioactive particle bombardment means provided in shielded relation thereto, a second scaling means in connection with said second radiation detector for producing a pulse responsive to a second number of pulses received from said second radiation detector, a second pulse shaping means in connection with said second scaling means for producing a second shaped pulse of different polarity, amplitude and duration than said first shaped pulse, a signal transmission means of desired center frequency, means in connection with said first and said second scaling means for modulating the frequency of said transmission means above and below its center frequency in respective response to the polarity, amplitude and duration of said first and second shaped pulses, and frequency discrimination means in remote connection with said transmission means for producing pulses of like character to said first and second shaped pulses responsive to the modulated signal from said transmission means, and receiving means in connection with said discrimination means for producing continuous indications of magnitude indicative of the repetition rate of pulses respectively produced by said first and said second radiation counters.

10. Well logging apparatus of the type described, comprising, a first radiation detector of pulse producing character, a first scaling means in connection with said first radiation detector for producing a pulse responsive to a first number of pulses received from said first radiation detector, a first pulse shaping means in connection with said first scaling means for producing a first shaped pulse of desired polarity and shape responsive to each pulse received from said first scaling means, a second radiation detector of pulse producing character, a second scaling means in connection with said second radiation detector for producing a pulse responsive to a second number of pulses received from said second radiation detector, a second pulse shaping means in connection with said second scaling means for producing a second shaped pulse of different polarity and shape than said first shaped pulse, a signal transmission means of desired center frequency, means in connection with said first and said second scaling means for modulating the frequency of said transmission means above and below its center frequency in respective response to the polarity, and shape of said first and second shaped pulses, frequency discrimination means in connection with said transmission means for producing pulses of like character to said first and second shaped pulses responsive to the modulated signal from said transmission means, and receiving means in connection with said discrimination means for producing continuous indications of magnitude indicative of the repetition rate of said first and second shaped pulses respectively.

11. Radioactivity well logging apparatus, comprising, a first radiation detector of pulse producing character, a first scaling means in connection with said first radiation detector for producing a pulse responsive to a first number of pulses received from said first radiation detector, a first pulse shaping means in connection with said first scaling means for producing a first shaped pulse of desired polarity and shape responsive to each pulse received from said first scaling means, a second radiation detector of pulse producing character, a second scaling means in connection with said second radiation detector for producing a pulse responsive to a second number of pulses received from said second radiation detector, a second pulse shaping means in connection with said second scaling means for producing a second shaped pulse of different polarity and shape than said first shaped pulse, a signal transmission means, means in connection with said first and said second scaling means for modulating the frequency of said transmission means in respective response to the polarity and shape of said first and second shaped pulses, frequency discrimination means in connection with said transmission means for producing pulses of like character to said first and second shaped pulses responsive to the modulated signal from said transmission means, and receiving means in connection with said discrimination means for producing continuous indications of magnitude indicative of the repetition rate of pulses respectively produced by said first and said second radiation counters.

12. The apparatus of claim 11 wherein said first number of pulses can be evenly divided by two.

13. The apparatus of claim 11 wherein said second number of pulses can be evenly divided by ten.

14. The apparatus of claim 13 wherein said first number of pulses can be evenly divided by two.

References Cited in the file of this patent

UNITED STATES PATENTS

| | | |
|---|---|---|
| 2,659,014 | Scherbatskoy | Nov. 10, 1953 |
| 2,670,442 | Herzog | Feb. 23, 1954 |